Sept. 17, 1940.  W. J. WEST  2,214,870

SIDING CUTTER

Filed Aug. 10, 1938

INVENTOR.
William J. West
BY Eugene W. Simpson
ATTORNEY.

Patented Sept. 17, 1940

2,214,870

UNITED STATES PATENT OFFICE 2,214,870

SIDING CUTTER

William J. West, Milwaukee, Wis.

Application August 10, 1938, Serial No. 224,052

7 Claims. (Cl. 164—73)

This invention relates to a siding cutting machine.

In the past, siding for the outside of building walls has been cut by a pocket knife, which is an extremely tiresome process and takes considerable time. This is especially true of sidings such as Inselbric which is a cornstalk and tar product approximately ⅝ of an inch thick with an outside face made to resemble a brick wall. The present machine is made especially to cut this product but it is to be understood that the machine may also be used to cut other types of heavy siding.

One object of the present invention is to produce a siding cutter which will hold and cut a siding board satisfactorily.

Another object is to reduce the time and labor required to cut heavy siding.

Another object is to produce a siding cutter which will clamp and hold the siding while cutting.

A further object is to produce a siding cutter which can be readily transported.

Another object is to produce a siding cutter that will cut a cornstalk and tar product siding such as Inselbric.

Other objects will be apparent from the following description.

Figure 1:
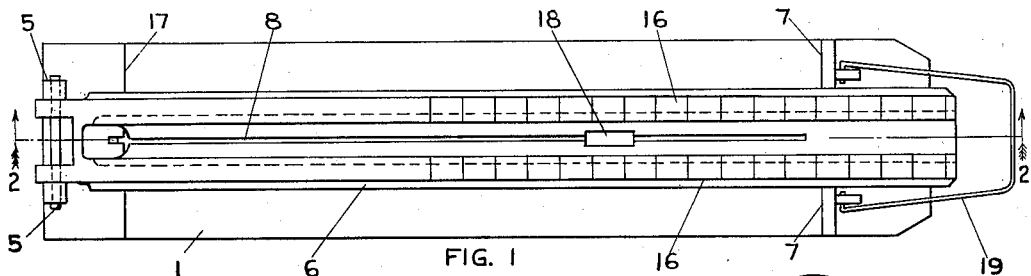
Fig. 1 is a plan view of a cutter, with the knife removed, embodying the principles of the invention.
Figure 2:
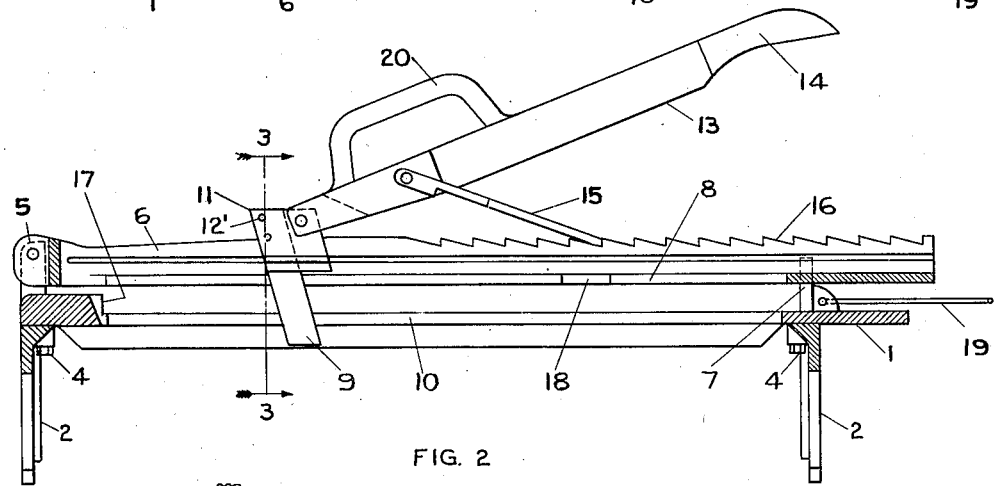
Fig. 2 is a cross-section on the line 2—2 of Fig. 1, looking in the direction of the arrows.

Referring to the drawing in which like numerals indicate like parts throughout the several views, the machine is formed on a base 1, which may be held above a support by a pair of footing members 2—2 which are secured to the base 1 by bolts 4 or other suitable securing means.

The base is provided at one end with bearing supports 5—5 which pivotally support a cutter guide 6, the cutter guide being held in proper position during cutting by the pivotal connection 5 at one end and by guide lugs 7—7 at the opposite end. The cutter guide is provided with a slot 8 through which a knife 9 may project, the knife extending through both the slot 8 and a corresponding slot 10 in the base 1.

The knife 9 is mounted in a groove in a knife carrier 11, which is guided between longitudinal slots 12—12 in the cutter guide 6 and is held in the groove by retaining bolts 12'.

The knife 9 is advanced to cut the siding S by a toggle and rack mechanism which comprises a lever 13 pivoted to the knife carrier 11 at one end and having a handle 14 at the opposite end and a link 15 pivoted to the lever intermediate the ends and engageable with a rack 16 formed on the upper surface of the cutter guide 6.

Downward pressure on the handle 14 thus clamps the siding S between the cutter guide 6 and the base 1, and at the same time advances the knife 9 to cut the siding.

A stop 17 is provided on the base against which the siding abuts. This stop prevents forward movement of the siding during cutting and prevents breaking of the edge as the knife completes the cut.

If desired, the slot 8 in the cutter guide 6 may be expanded as at 18 to permit the operator to see any mark he might place on the siding to guide his cutter.

A carrying lock 19 in the form of an inverted U is pivoted to the lugs 7 and engages over the lever 13 to enable the operator to transport the cutter conveniently. A handle 20 is formed on the lever 13 for convenience in carrying.

Figure 5:
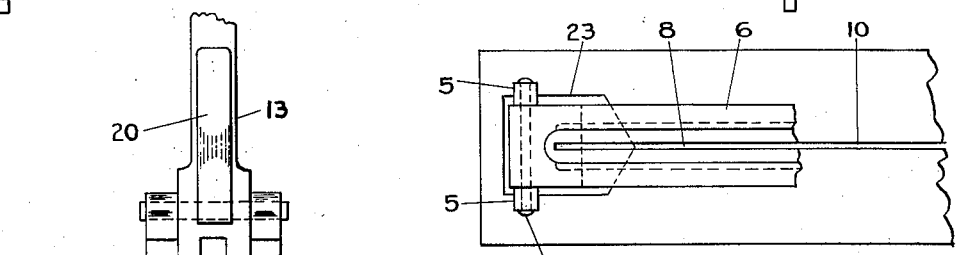
Fig. 5 is a plan view of Fig. 4.
Figures 3, 4:
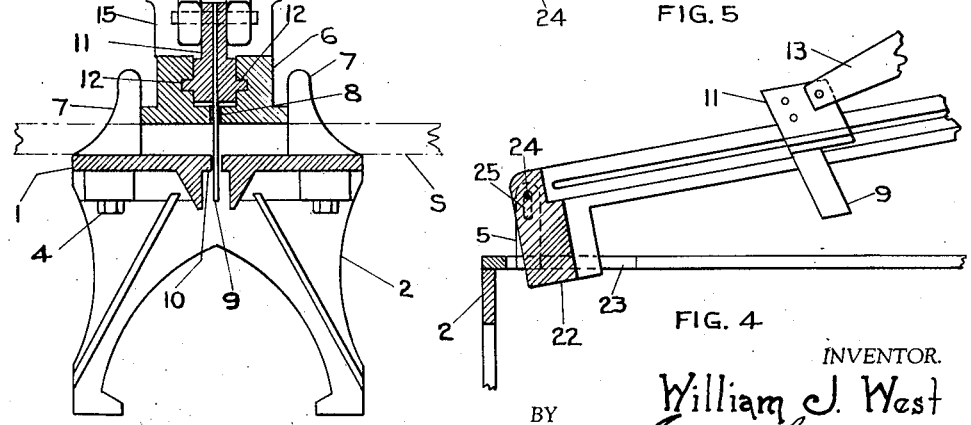
Fig. 3 is a cross-section on the lines 3—3 of Fig. 2, looking in the direction of the arrows.
Fig. 4 is an elevational cross-section similar to Fig. 2, showing a portion of a modification of the machine.

The modification of the invention shown in Figs. 4 and 5 shows the pivot end of a siding cutter in which a stop member 22 is formed on the cutter guide 6. The stop member 22 projects through a hole 23 in the base 1. The cutter guide 6, in Fig. 4, is carried on a pivot 24 which is mounted in parallel slots 25 in the bearing supports 5, so that the cutter guide 6 is adapted to move up or down to accommodate various thicknesses of siding.

Having thus described the invention it is hereby claimed as follows:

1. A cutter adapted to cut siding or the like comprising, a base, a cutter guide pivotally mounted on said base, a knife carried by said cutter guide and a single means to actuate said knife and to clamp the siding between the cutter guide and the base.

2. A cutter adapted to cut siding or the like comprising, a base adapted to receive a siding board to be cut, a cutter guide pivotally connected to said base and engageable with the siding, a stop member on said cutter adjacent the pivotal connection to limit the forward movement of the siding, a knife carried by said cutter guide and a single means to actuate the knife and simultaneously to clamp the cutter guide on the siding.

3. A cutter adapted to cut siding or the like comprising, a base adapted to receive a siding board to be cut, a cutter guide pivotally connected to said base and engageable with the siding, a stop member on said cutter to limit the forward movement of the siding, a knife carried by said cutter guide and a toggle joint adapted simultaneously to actuate the knife and to exert a downward pressure on the cutter guide to clamp the siding under the cutter guide.

4. A cutter adapted to cut siding or the like comprising, a base adapted to receive a siding board to be cut, a cutter guide pivotally connected to said base and engageable with the siding, a stop member formed on said base adjacent the pivot to limit the forward movement of the siding, a knife carried by said cutter guide and a single means to actuate the knife and simultaneously to clamp the cutter guide on the siding.

5. A cutter adapted to cut siding or the like comprising, a base adapted to receive a siding board to be cut, a cutter guide pivotally connected to said base and engageable with the siding, a stop member formed on said base adjacent the pivot to limit the forward movement of the siding, a knife carried by said cutter guide and a toggle joint adapted simultaneously to actuate the knife and to exert a downward pressure on the cutter guide to clamp the siding under the cutter guide.

6. A cutter adapted to cut siding or the like comprising, a base adapted to receive a siding board to be cut, a cutter guide pivotally connected to said base and engageable with the siding, a stop member formed on said cutter guide to limit the forward movement of the siding, a knife carried by said cutter guide and a single means to actuate the knife and simultaneously to clamp the cutter guide on the siding.

7. A cutter adapted to cut siding or the like comprising, a base adapted to receive a siding board to be cut, a cutter guide pivotally connected to said base and engageable with the siding, a stop member formed on said cutter guide to limit the forward movement of the siding, a knife carried by said cutter guide and a toggle joint adapted simultaneously to actuate the knife and to exert a downward pressure on the cutter guide to clamp the siding under the cutter guide.

WILLIAM J. WEST.